Sept. 28, 1926.

S. G. NEAL ET AL 1,601,579

EMPTY AND LOAD AIR BRAKE APPARATUS

Filed Oct. 29, 1924

INVENTORS
Spencer G. Neal.
William Astle.
Edward P. Wilson.
BY
ATTORNEYS

Patented Sept. 28, 1926.

1,601,579

UNITED STATES PATENT OFFICE.

SPENCER G. NEAL, OF NEW YORK, WILLIAM ASTLE, OF BROOKLYN, NEW YORK, AND EDWARD P. WILSON, OF EAST ORANGE, NEW JERSEY, ASSIGNORS TO AUTOMATIC AIR BRAKE COMPANY, OF WILMINGTON, DELAWARE, A CORPORATION OF DELAWARE.

EMPTY AND LOAD AIR-BRAKE APPARATUS.

Application filed October 29, 1924. Serial No. 746,570.

A number of efforts have been made to provide what is known as an empty and load brake. Such a brake may be adjusted for light braking on an empty car and for heavy braking when the car is loaded. These empty and load brakes, in so far as they have been practically applied in railroad service, are very complicated, expensive and very heavy. Some of them are unsatisfactory because they are not suitable for use on cars inter-changed on various railroads because they do not work in complete harmony with the present standard Westinghouse freight brake.

One of the principal objects of this invention is to provide an empty and load brake of very simple construction and which is operated by varying the ratio of brake cylinder pressure developed upon a given brake pipe reduction. When adjusted for light or empty car braking the ratio of brake cylinder pressure built up from a given brake pipe reduction will be low, for instance, one or one and a half to one; when, however, the brake is adjusted for load braking the ratio of brake cylinder pressure built up for a given brake pipe reduction will be high, for instance three or three and one-half to one. With an empty and load air brake apparatus operating on this principle a single brake cylinder is used in which a low pressure is developed for empty car braking and a high pressure is developed for loaded car braking, the same degree of brake pipe reduction producing the high or the low pressure in the brake cylinder according to the adjustment of the triple valve.

Another object of the invention is to provide an empty and load brake which in both its empty car braking position and in its loaded car braking position will work in harmony with the present standard form of air brake apparatus.

There are many other important objects and advantages of the invention, all of which will fully hereinafter appear.

In the drawings the invention is shown as applied to a triple valve constructed in accordance with the co-pending application Serial No. 742,560, filed October 9, 1924. It will be understood, however, that the invention may be applied to any suitable form of triple valve, having the necessary operating characteristics, for instance, the triple valve shown in Patents No. 1,502,520 and 1,502,521 dated July 22, 1924.

In order to simplify the description of the triple valve, the various parts, and the ports and passages, will not be specifically described except in connection with the various operations of the triple valve.

*Full release and brake pipe reservoir charging position and operation (Fig. 1).*

Figure 1:
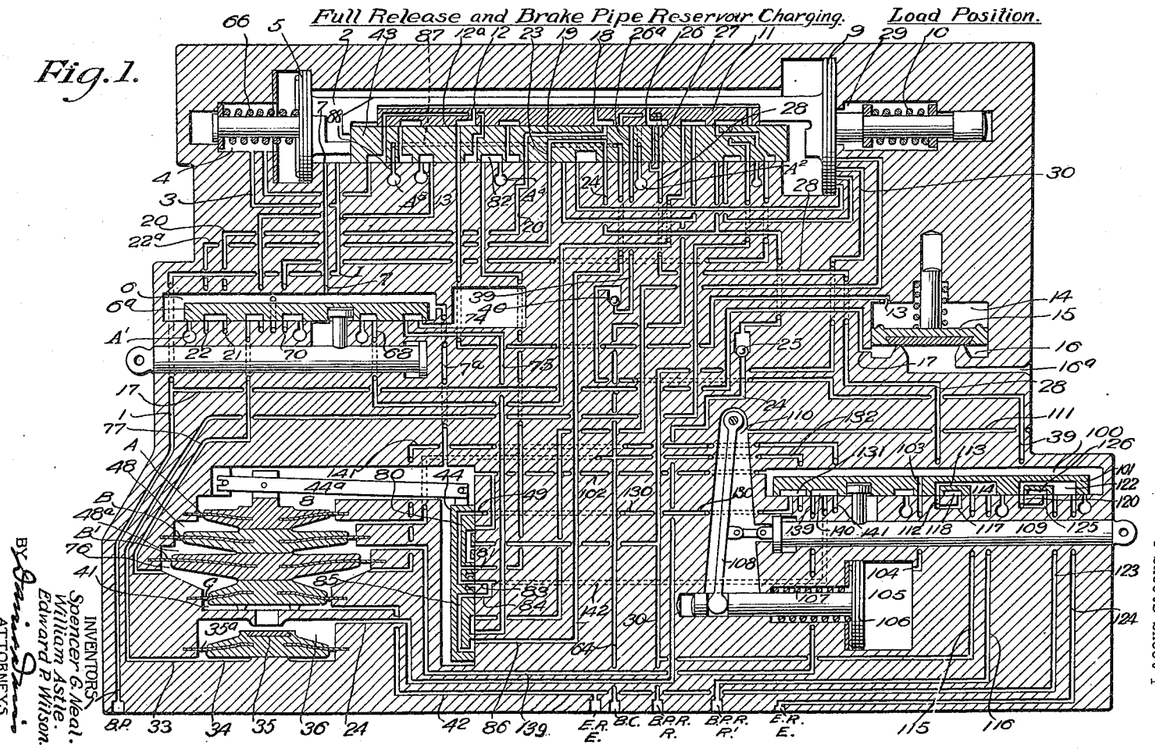
Fig. 1 is a diagrammatic view of a triple valve constructed in accordance with this invention, the parts being shown in full release and brake pipe reservoir charging position, the change-over valve being in load braking position.

*Change-over valve in load position.*—When charging the system air passes from the brake pipe through passage 1 to the main brake pipe chamber 2 in which are arranged the main and supplemental slide valves. Brake pipe air flows from passage 1 through passage 3 into the supplemental brake pipe chamber 4. As the pressure equalizes on opposite sides of the supplemental emergency piston 5, said piston is inoperative at this time, that is to say it does not move. From the chamber 2 brake pipe pressure flows to the release governing valve chamber 6 through passage 7. Passage 7ª connects the release governing valve chamber to the actuating chamber 8 of the service application valve so that brake pipe air will flow into the said chamber. The pressure of air in chamber 2 forces the larger emergency and release piston 9 toward the right, compressing the emergency spring 10. The supplemental slide valve 11 is connected to the stem of the piston 9 and moves with it. The main slide valve 43 is connected to the piston stem of the supplemental emergency piston 5 and moves with said piston. In the release and charging position of the main slide valve, piston 5 is at the innermost limit of its movement and rests against a shoulder in the valve casing and is held in that position by a supplemental emergency spring 66 arranged in the supplemental brake pipe chamber 4.

Figures 5, 6:
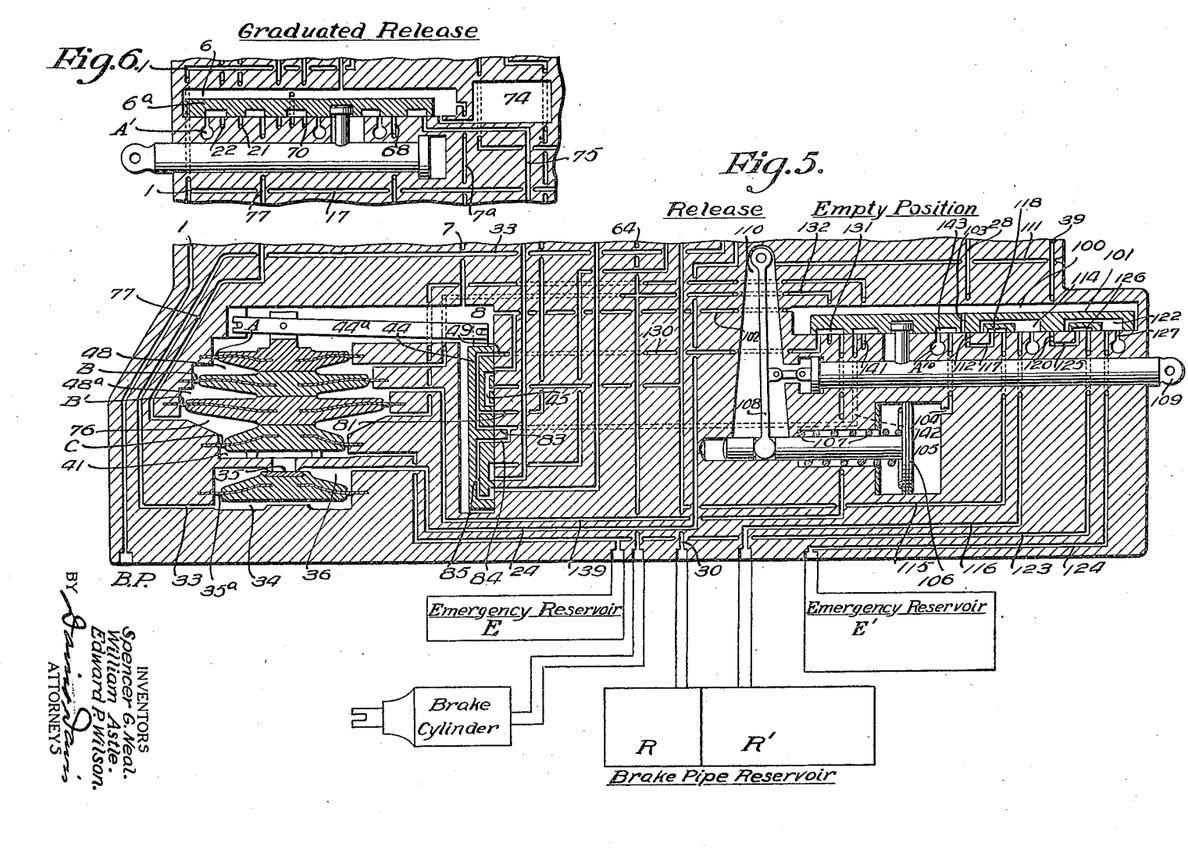
Fig. 5 a view similar to Fig. 4 showing the parts in release position.
Fig. 6 a diagrammatic view showing the release governing valve in graduated release position.

Air flows from chamber 2 through port 12 of the supplemental slide valve, port 12$^a$ of the main slide valve, passage 13 to the chamber 14 in which is arranged the brake pipe vent valve 15, and holds said valve to its seat. Brake pipe pressure is registered in chamber 16 beneath valve 15 through passage 17 which is connected directly to brake pipe passage 1. The brake pipe vent valve is provided with a spring, which tends to hold it seated. The spring and the superior downward force on valve 15 hold the valve to its seat except in emergency application position, as described in application Serial No. 742,560. Air from chamber 2 passes through port 18 of the supplemental slide valve, port and passage 19 of the main slide valve, passage 20 to port 21 in the seat of the release governing valve 6$^a$. Port 21 is closed when the release governing valve is in graduated release position. In the quick release position of the valve 6$^a$ port 21 is connected to a port 22 by a cavity in the release governing valve. Port 22 is connected by passage 22$^a$ to port and passage 23 of the main slide valve and by passage 24 to a supplemental emergency reservoir chamber 36. In the passage 24 is arranged a check valve 25 which prevents the flow of air from port 22 to the chamber 36, said check valve permitting the flow of air in the reverse direction. The check valve 25 prevents the passage of air to chamber 36 during the charging operation.

Brake pipe air enters chamber 100 through passage 102 connected to the actuating chamber 8. In chamber 100 is arranged a slidable change-over valve 101. From chamber 100 air flows through port 103 of the change-over valve and through passage 104 to piston chamber 105. In this chamber is arranged a piston 106 connected by its piston stem and lever 108 to the operating rod 109 of the change-over valve. Air flowing into chamber 105 holds piston 106 to its seat, compresses spring 107 and holds valve 101 in load braking position. Chamber 110 in which is arranged lever 108, is connected to atmosphere through an open port 111.

The brake pipe reservoir is in two parts R and R′, section R′ being of greater volume than section R, and both parts being used when the change-over valve is in load braking position. Both sections of this reservoir are charged from chamber 2 through port 26 of the valve 11, port 27 of the main slide valve and passage 28 which leads to port 112 in the seat of the change-over valve 101. Port 112 communicates with port and passage 113 in the change-over valve and said passage opens into cavity 114 of said valve. Cavity 114 places passages 115 and 116 in communication with each other and with the passage 113. Passage 115 leads direct to section R of the brake pipe reservoir through passage 30 and passage 116 leads direct to section R′ of said reservoir. Both sections of the said reservoir will therefore be charged at the same time and port 112 is of the proper capacity for this purpose.

A brake pipe reservoir chamber 29 is formed on the opposite side of piston 9 from the main brake pipe chamber 2 and this chamber 29 is connected to the section R of the brake pipe reservoir by passage 30 so that brake pipe reservoir pressure will be registered in chamber 29, said pressure opposing the brake pipe pressure in chamber 2. When the brake pipe reservoir pressure in chamber 29 equalizes with the brake pipe pressure in chamber 2 the emergency spring 10 will move the piston 9 and the supplemental slide valve 11 to emergency reservoir charging position.

*Emergency reservoir charging (Figs. 1 and 2).*

*Load position.*—In the emergency reservoir charging position of the supplemental slide valve the pressure of the spring 10 is taken up by two stop shoulders on the stem of the piston 9 and ceases to exert any force tending to move the piston. In this position of the piston 9 an abutment thereon engages the end of the main slide valve (see Fig. 2). In this position of the valves the air pressures on opposite sides of the pistons 5 and 9 are at an equality. Air from chamber 2 will pass through port 31 of the supplemental slide valve, port 32 of the main slide valve, passage 33 to the emergency reservoir control chamber 34. The control chamber 34 is separated from the supplemental reservoir chamber 36 by a control diaphragm 35$^a$ which carries an emergency reservoir valve 35. Valve 35 controls a passage connecting the emergency reservoir to the chamber 36, as will be hereinafter set forth. Chamber 36 is at this time vented to atmosphere through passage 24, past check valve 25, through port and passage 23 of the main slide valve, passage 22$^a$ to port 22 of the release governing valve seat. In the graduated release position of the release governing valve 6ª port 22 is connected to atmosphere through a cavity in said valve and an atmospheric port A¹ (see Fig. 6). In the quick release position of the valve 6ª port 22 is connected by the cavity in the valve 6ª to port 21, passage 20, port and passage 19 of the main slide valve, port 47 of the valve 11, port 38 of the main slide valve and atmospheric port A².

Figure 2:
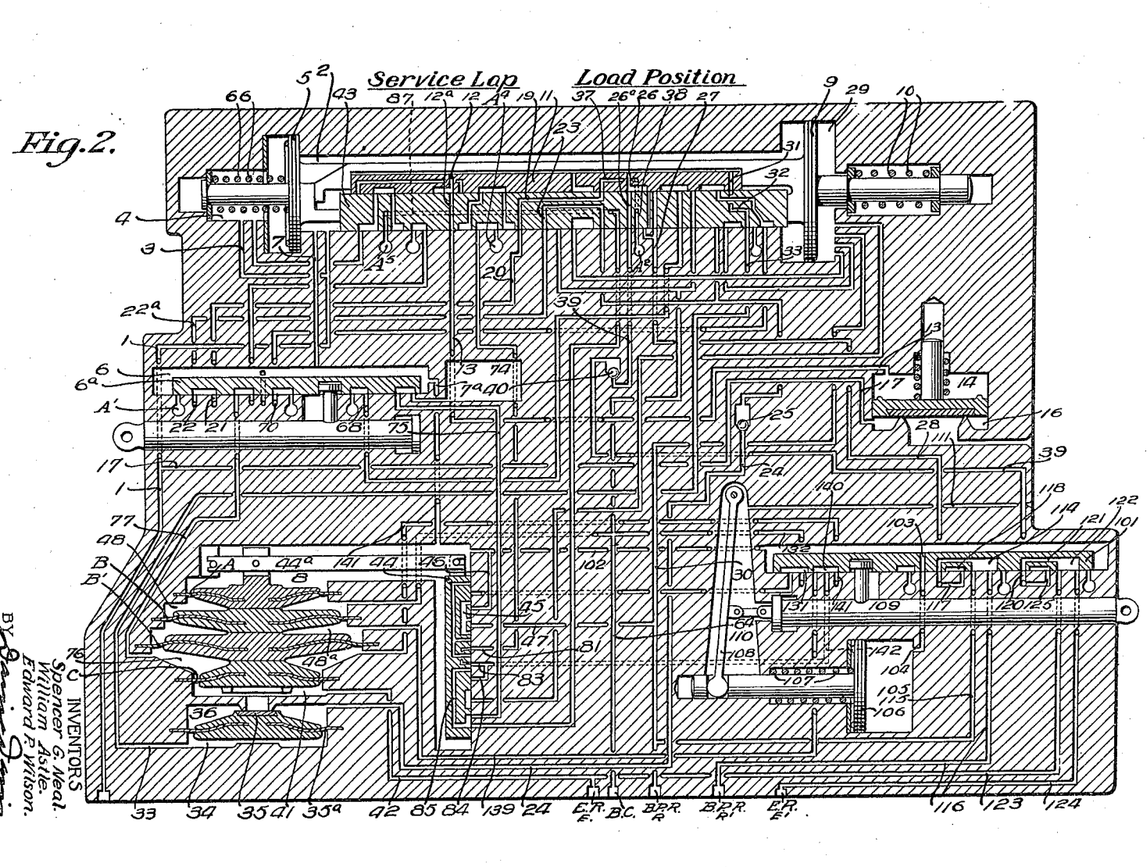
Fig. 2 a view similar to Fig. 1 showing the parts in service lap position.

The emergency reservoir is in two parts E and E', both parts being used when the change-over valve is in load braking position. Section E' is of larger volume than section E. Both sections of this reservoir are charged from chamber 2 through port 26 of the supplemental slide valve, port 26ª of the main slide valve, passage 39, past check valve 40 to port 120 in the seat of the change-over valve. Port 120 communicates with port and passage 121 in the change-over valve and said passage opens into cavity 122 of said valve. Cavity 122 places passages 123 and 124 in communication with each other and with the passage 121. Passage 123 leads direct to section E of the emergency reservoir and passage 124 leads direct to section E' of said reservoir. Both sections of the said reservoir will therefore be charged at the same time and port 120 is of the proper capacity for this purpose.

The emergency reservoir chamber 41 of the application valve is connected directly to the emergency reservoir section E through passage 42. Chamber 41 is directly connected to the supplemental emergency reservoir chamber 36 through a passage controlled by the emergency reservoir valve 35. When the emergency reservoir pressure equals the pressure of the brake pipe and of the brake pipe reservoir the system is fully charged and the parts are then in the position shown in Fig. 2, the fully charged and running position being the same as service lap position. A single emergency reservoir may be used, if desired.

*Reservoir charging operation with the change-over valve in empty car braking position.*

Figure 4:
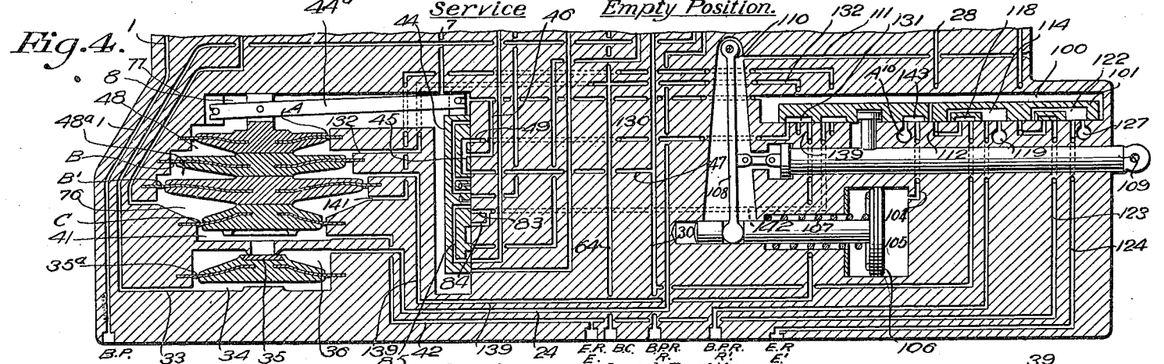
Fig. 4 a view similar to Fig. 3 showing the change-over valve in empty car braking position.

When the change-over valve is in empty car braking position as shown in Figs. 4 and 5, port 112 is closed. Passage 116 from section R' of the brake pipe reservoir is connected to atmosphere by cavity 114 and port 119 and that section of the reservoir will not be charged. Passage 115 from section R of the brake pipe reservoir is in register with a cavity 118 of the change-over vlave and said cavity places said passage in communication with a branch port 117 leading to passage 28 so that section R of the said reservoir will be charged from said passage. Port 117 is of the proper size to charge at the desired rate.

The empty car braking position of the change-over valve will close port 120 and place passage 124 in communication with the atmosphere through port 127. Section E' of the emergency reservoir will not be charged and is entirely disconnected from the other section of said reservoir. Passage 123 from section E of the emergency reservoir is connected by cavity 126 of the change-over valve to branch port 125 which leads to passage 39 so that section E of the emergency reservoir will be charged from said passage. Port 125 is of the proper size to charge at the proper rate.

*Service application position (Figs. 2 and 3).*

Figure 3:
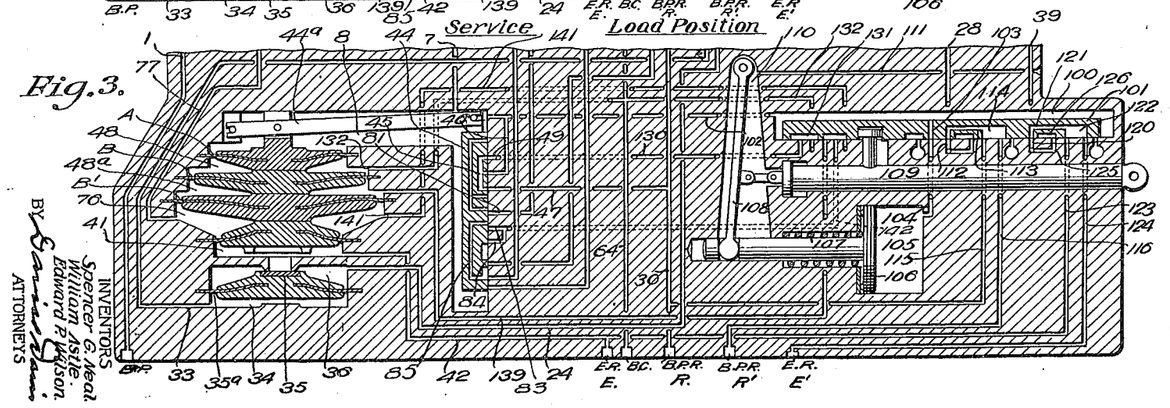
Fig. 3 a partial diagrammatic view similar to Fig. 1 with the parts in service position.

*Load braking position.*—The service application valve 44 is operatively connected by a lever 44ª to a pulsating diaphragm structure. This structure consists of an actuating diaphragm A, a high pressure equalizing diaphragm B, a low pressure equalizing diaphragm B', and an emergency diaphragm C. The actuating diaphragm forms one wall of the actuating chamber 8 in which chamber is arranged the operating lever 44ª. Between the diaphragms A and B is formed a high pressure equalizing brake cylinder chamber 48; between diaphragms B and B' is formed a low pressure equalizing brake cylinder chamber 48ª; and between the diaphragms B' and C is formed a retention chamber 76. Below the emergency reservoir diaphragm C is formed the emergency reservoir chamber 41, hereinbefore referred to. A rigid wall separates the chamber 41 from the supplemental emergency reservoir chamber 36, and the emergency reservoir valve 35 controls a passage through said wall. The service application valve moves in response to variations of pressure in the chambers formed by the said diaphragms, as will be fully described herein. The high pressure equalizing diaphragm B is larger in diameter than the actuating diaphragm and the emergency diaphragm. The low pressure equalizing diaphragm B' is larger than the diaphragm B. The emergency diaphragm C is smaller in area than the actuating diaphragm A. The equalizing diaphragms B and B' are larger in area than the actuating diaphragm and the emergency diaphragm, in order that the desired brake cylinder pressure will be built up in the brake cylinder before the service application valve is moved to lap position, as hereinafter described. The emergency reservoir diaphragm C is slightly smaller than the actuating diaphragm A in order that when there is an equality of pressures in chamber 8 and chamber 41 the diaphragms will be moved to hold the service application valve in release position. This ensures the release position of the service application valve when the system is fully charged.

The diaphragm structure has a slight longitudinal movement and fixed rigid stops are provided to arrest the diaphragm structure and the service valve in application position and in release position.

When a service application of the brakes is desired a service reduction in brake pipe pressure is made in the usual manner through the engineer's brake valve and results in a reduction of pressure in chambers 2, 4, and 8. As the pressure in chambers 2 and 4 will be reduced uniformly there will be no tendency to move the piston 5. A service reduction of pressure in chamber 2 will not create a sufficient differential of pressure in chambers 29 and 2 to cause a movement of the piston 9. The emergency spring 10 and the supplemental emergency spring 66 operating on the piston 5 will hold the piston 9 and the main slide valve from movement and these pistons and the slide valves will remain in the positions shown in Fig. 2. The reduced brake pipe pressure in chamber 8 will be over-balanced by the undisturbed emergency reservoir pressure in chamber 41 and the diaphragms will be moved upwardly and the valve 44 will be moved to service position, as shown in Fig. 3. Brake pipe air will flow to the mingling chamber 45 through passage 46 which leads into actuating chamber 8. Brake pipe reservoir air from both sections of said reservoir will flow into the mingling chamber through passage 47 which is connected directly to brake pipe reservoir passage 30, both sections of said reservoirs being connected together by cavity 114 of the changeover valve. From the mingling chamber 45 air will flow to port 49 of the service valve seat, through passage 130 to a port in the seat of the change-over valve. A cavity 131 in the change-over valve connects this latter port to a port and passage 132 which leads to the brake cylinder passage 64. Passage 132 also leads from the said brake cylinder passage direct to the high pressure brake cylinder equalizing chamber 48. When the proper brake cylinder pressure is developed in chamber 48 in proportion to the brake pipe reduction registered in chamber 8 the diaphragms and the valve 44 return to lap position as shown in Fig. 2, in which position the flow of air to the brake cylinder is stopped. Should the brake cylinder pressure be lowered through leakage the balance of pressures in the diaphragm structure is destroyed and the diaphragms and the valve 44 will again assume service position and the brake cylinder pressure will be again built up to the desired pressure and in proportion to the brake pipe pressure reduction in chamber 8. If it be desired to increase the brake cylinder pressure a further reduction of brake pipe pressure in chamber 8 will result in the service valve moving to application position with the result that the brake cylinder pressure will be built up in proportion to the brake pipe reduction.

The high pressure equalizing diaphragm B is of the required area to produce the desired high brake cylinder pressure before the service application valve is moved to lap position. The ratio of this pressure will be approximately three to one, so that a fifteen pound brake pipe reduction will develop a forty-five pound brake cylinder pressure before the service valve is moved to lap position.

During the service operation the chamber 36 will be vented to atmosphere and the chamber 34 will be connected to chamber 2 so that the valve 35 will be held closed as shown in Figs. 2 and 3. At this time chambers 48$^a$ and 76 are also vented to atmosphere.

The operation of the main and supplemental slide valves will be as described in the application herein mentioned and bearing the Serial Number 742,560 and filed October 9, 1924.

*Release with the release governing valve in quick release position (Fig. 1).*

*Load braking.*—The release governing valve stem is moved to its innermost position, as shown in Figs. 1 and 2, in order to place the release governing valve 6$^a$ in position for the quick release of brake cylinder pressure. To release the brake cylinder pressure after a service application, the brake pipe pressure is increased. This results in an increase of pressure in chamber 2 above the brake pipe reservoir pressure in chamber 29 and the piston 9 is moved to the right or toward the chamber 29. The piston 9 carries with it the supplemental slide valve 11, the main slide valve remaining stationary, the parts assuming the position shown in Fig. 1. The flow of air through the triple valve from chamber 41 to chamber 2 and thence to the brake pipe is as described in application, Serial No. 742,560 and need not be set forth herein. Air is also released from chamber 29 to release chamber 74, as described in the said application. The two emergency reservoir sections are connected to chamber 41 by passage 124, cavity 122 of the change-over valve passage 123, and passage 42. When operating in quick release the retention chamber 76 is connected to atmosphere through the release governing valve at all times except in emergency applications, as described in application, Serial No. 742,560.

*Release with the release governing valve in graduated release position. (Figs. 1 and 6.)*

*Load braking.*—The release governing valve stem is drawn to its outer position in order to place the release governing valve in graduated release position, as shown in Fig. 6. With the release governing valve in graduated release position passage 77 from the retention chamber 76 is closed, and the quick release chamber 74 is connected directly to the release governing valve chamber 6, as hereinbefore described. Passage 75 is closed to prevent the venting of air from chamber 29 during release operations. The brake cylinder exhaust port 68 is closed to prevent the escape of brake cylinder pressure through the release governing valve. Passage 70 is connected to chamber 6 to prevent the venting of the control chamber 34 when the main and supplemental slide valves are moved to release positions. Port 21 is closed to prevent the release of air from chamber 34, and thereby prevent the passage of emergency reservoir air to chamber 2; and port 22 is connected to atmospheric port $A^1$ in order to vent the supplemental emergency reservoir chamber 36 to atmosphere. When the change-over valve is in load position, chambers $48^a$ and 76 of the diaphragm structure are in free communication with each other through passage 139, cavity 140 of the change-over valve and passage 141 to chamber 76.

To release the brake cylinder pressure after a service application of the brakes, and with the release governing valve in graduated release position, the brake pipe pressure is increased in the usual way and this results in an increase of pressure in chambers 2, 4 and 8. The emergency piston 9 and the supplemental slide valve will be moved to release position, but this will be an idle operation in so far as the release of brake cylinder pressure is concerned, because the brake cylinder exhaust through the main slide valve has been cut off by the adjustment of the release governing valve. The increase in pressure in chamber 8 will move the actuating diaphragm A and also diaphragms B, B' and C downwardly, and carry the service slide valve from service lap position, as shown in Fig. 2, to release position, as shown in Fig. 1. Brake cylinder pressure will be vented to atmosphere through passages 64 and 132, cavity 131 of the change-over valve, passage 130, port 49, chamber 80 of the service valve 44, port and passage 81 to cavity 82 of the main slide valve 43 and thence to atmospheric port $A^4$. This is the principal exhaust for brake cylinder air. From chamber 80 of the valve 44 brake cylinder air flows into the retention chamber 76 through port 83, passage 142, cavity 140 of the change-over valve, passage 141 to chamber 76. From cavity 140 brake cylinder air also flows to chamber $48^a$ through passage 139. Approximately brake cylinder pressure is thus registered in the equalizing chambers 76 and $48^a$. The pressure on both sides of diaphragm B' being equal said diaphragm is inoperative, and chambers $48^a$ and 76 are in effect a single chamber. From these two chambers $48^a$ and 76 there is a controllable vent to atmosphere. Both of said chambers are connected to cavity 140 of the change-over valve, as herein described, thence through passage 142 to port 84, which is a branch port from port 83, and said passage 84 leads to atmosphere through port and passage 85 of the valve 44 and passage 86, port and passage 87 of the main slide valve, passage 88 and atmospheric port $A^5$. The purpose of this connection to atmosphere is to assure that the pressure in chambers $48^a$ and 76 is slightly below that in brake cylinder chamber 48. If only a partial release of the brake cylinder pressure is desired the brake pipe pressure will only be partially returned to normal, the increase in brake pipe pressure governing the amount of brake cylinder pressure released. When the brake cylinder pressure in chamber 48 has been sufficiently reduced to permit the emergency reservoir pressure in chamber 41 to prevail over remaining pressure in said chamber 48 and the increased brake pipe pressure in chamber 8, the service slide valve 44 will be moved back to lap position. In the lap position of the service valve (see Fig. 2) the retention chamber 76 and chamber $48^a$ are not sealed. This operation may be continued in steps until the pressure in chamber 8 has been stepped up to an equality with the pressure in chamber 41, at which time all of the brake cylinder pressure will have been released.

The reasons for providing the retention chambers are fully set forth in application Serial No. 742,560, herein referred to.

*Emergency application position.*

*Load braking.*—An emergency operation of the triple valve is produced by a sudden and great reduction of brake pipe pressure in the usual manner. This results in a sudden reduction of pressure in chamber 2, and the triple parts operate precisely as described in application, Serial No. 742,560. Both sections of the emergency reservoir equalize with the brake cylinder through chamber 41, chamber 36, passage 24, past check valve 25, and to chamber 29 and to the brake cylinder as described in said application. Both sections of the brake pipe reservoir serve as one and flow as described in application, Serial No. 742,560. The movements of the parts to emergency lap and to release after emergency application are precisely as described in the said application, Serial No. 742,560, dated October 9, 1924 and need not be described herein.

*Service application position (Figs. 4 and 5).*

*Empty car braking position.*—In order to adjust the triple valve for empty car braking the change-over valve rod 109 is pulled to its outer position, as shown in Figs. 4 and 5. This operation places the change-over valve in position to vent emergency reservoir section E' to atmosphere through port 127, and also vents section R' of the brake pipe reservoir to atmosphere through port 119, as hereinbefore described. It is therefore clear that in empty car braking only emergency reservoir section E will be used in emergency applications of the brakes and in the quick release of the brakes; and that only section R of the brake pipe reservoir will be used in service applications of the brakes. In empty car, or low pressure, braking, comparatively low brake cylinder pressures are developed and it is therefore unnecessary to use both sections of the emergency and brake pipe reservoirs. In loaded car, or high pressure, braking, it is desirable to provide a large volume of high pressure air. For these reasons the emergency reservoir and the brake pipe reservoir are formed in two sections and these sections are connected to the triple valve in such a manner that by the manual adjustment of the change-over valve the total volume of all the reservoirs may be used in high pressure braking and a less volume used for empty car or low pressure braking.

When a service application of the brakes is desired a service reduction in brake pipe pressure is made in the usual manner through the engineer's brake valve and the service valve will go to service position precisely as described herein in the load braking operation, and as shown in Fig. 4. Brake pipe air will flow to the mingling chamber 45 through passage 46 which leads into actuating chamber 8. Brake pipe reservoir air from section R of the brake pipe reservoir will flow into the mingling chamber through passage 47 which is connected directly to the said brake pipe reservoir section by passage 30. As hereinbefore described section R' of the brake pipe reservoir is at this time vented to atmosphere through port 119. From the mingling chamber 45 air will flow through the change-over valve to the brake cylinder precisely as hereinbefore described. Brake cylinder air also flows from cavity 131 of the change-over valve through passage 132 to the high pressure brake cylinder equalizing chamber 48, as hereinbefore described. With the change-over valve in empty car braking position cavity 131 connects port and passage 130 to port and passage 139. This latter passage leads to the low pressure brake cylinder equalizing chamber 48ᵃ so that brake cylinder pressure will equalize on opposite sides of the high pressure equalizing diaphragm B and said diaphragm will be inoperative. The low pressure equalizing diaphragm B' is larger than the high pressure equalizing diaphragm, as hereinbefore described, and the air in the low pressure equalizing chamber 48ᵃ will exert a downward force on said diaphragm, said downward force assisting the reduced brake pipe pressure in chamber 8 to overcome the undisturbed emergency reservoir pressure in chamber 41. Because of the large area of the diaphragm B' the service valve will be moved to lap position with a low pressure in the brake cylinder. As hereinbefore set forth the ratio of brake cylinder pressure to brake pipe reduction, in empty car braking, will be approximately one or one and a half to one, and the effective area of the diaphragm B' will be proportioned to produce that result. When the proper degree of brake cylinder pressure has been developed in the low pressure equalizing chamber 48ᵃ, in proportion to the brake pipe reduction in chamber 8, the service valve 44 will be moved to service lap position. A reduction in brake cylinder pressure through leakage will be compensated for as hereinbefore described.

*Release operations.*

*Empty car braking.*—With the release governing valve in quick release position, the release operation of the triple valve is precisely the same as described in connection with load braking except that only emergency reservoir section E is connected to chamber 41.

With the release governing valve in graduated release position and the service valve in release position, air will pass to chamber 76 from the passage 80 through port 83, passage 142, cavity 140 of the change-over valve, passage 141 into chamber 76. The controllable venting from chamber 76 to atmosphere is through port 84, passages 85 and 86, passage 87 in the main slide valve 43, port 88 and atmospheric port A⁵. The build-up of pressure in the chamber 76 is precisely as hereinbefore described and as more completely described in the patents noted herein.

When the change-over valve is in empty car braking position (Figs. 4 and 5) the chamber 105 at the right of piston 106 is vented to atmosphere through passage 104, cavity 143 in the change-over valve and atmospheric port A¹⁰. The spring 107 acting on piston 106 holds the change-over valve in empty car braking position. If desired, any suitable form of means may be provided for locking the change-over valve in its empty car braking position.

*Emergency application.*

*Empty car braking.*—The operation of the triple valve in emergency applications and with the change-over valve in empty car braking position is precisely as described in connection with load braking except that only one section of the emergency reservoir is connected to chamber 41, the other section of the reservoir being vented to atmosphere as described. The movements of the parts to emergency lap and to release in emergency application are precisely as hereinbefore indicated.

*Change-over valve.*

When operating with the change-over valve in load braking position brake pipe air is registered in chamber 105. The pressure of this air holds piston 106 against its seat and thereby holds the change-over valve in its load braking position. Should a car equipped with a triple valve operating in load braking position be placed on a side track and disconnected from a train the air in the system will gradually leak down and be depleted. This results in a reduction of pressure in chamber 105 and as soon as that pressure is reduced a predetermined degree the spring 107 will move piston 106 and, through its connection to the change-over valve operating rod 109, will shift the change-over valve to empty car braking position. It is clear therefore that the change-over valve will be automatically returned to empty car braking position upon a depletion, or approximately a depletion of air in the system. The object of this automatic return of the change-over valve to empty car braking position is to prevent wheel damage which would result if the brakes on an unloaded car were operated with the change-over valve in load braking position.

What we claim is:—

1. A triple valve for an air brake apparatus comprising means operating upon a reduction of brake pipe pressure to build up brake cylinder pressure in direct ratio to the brake pipe reduction, and an adjustable change-over valve means to vary the ratio of brake cylinder pressure produced by a given brake pipe reduction.

2. A triple valve for an air brake apparatus comprising means operating upon a reduction of brake pipe pressure to build up brake cylinder pressure in direct ratio to the brake pipe reduction the brake cylinder pressure moving the valve to lap position, and manually adjustable change-over valve means to vary the ratio of brake cylinder pressure produced by a given brake pipe reduction.

3. A triple valve for an air brake apparatus comprising means operating upon a reduction of brake pipe pressure to build up brake cylinder pressure in direct ratio to the brake pipe reduction the brake cylinder pressure moving the valve to lap position, and manually adjustable means to vary the ratio of brake cylinder pressure produced by a given brake pipe reduction, said means having a low pressure braking position and a high pressure braking position, and means whereby brake pipe pressure will hold said adjustable means in its high pressure braking position.

4. A triple valve for an air brake apparatus comprising a service valve subject to brake pipe, brake cylinder and emergency reservoir pressures and operating upon a reduction of brake pipe pressure to admit air to the brake cylinder in direct ratio to the brake pipe reduction, means whereby the brake cylinder pressure will move the service valve to lap position when the desired degree of pressure is in the brake cylinder, manually operable means to vary the ratio of brake cylinder pressure developed from a given brake pipe reduction, said means having a low pressure braking position and a high pressure braking position, and means whereby brake pipe pressure will hold said manually operable means in its high pressure braking position.

5. A triple valve for an air brake apparatus comprising a service valve subject to brake pipe, brake cylinder and emergency reservoir pressures and operating upon a reduction of brake pipe pressure to admit air to the brake cylinder in direct ratio to the brake pipe reduction, means whereby the brake cylinder pressure will move the service valve to lap position when the desired degree of pressure is in the brake cylinder, and manually operable means to vary the ratio of brake cylinder pressure developed from a given brake pipe reduction.

6. A triple valve for an air brake apparatus comprising means operating upon a reduction brake pipe pressure to build up brake cylinder pressure in direct ratio to the brake pipe reduction the brake cylinder pressure moving the valve lap position, and manually adjustable means to vary the ratio of brake cylinder pressure produced by a given brake pipe reduction, said means having a low pressure braking position and a high pressure braking position, means whereby brake pipe pressure will hold said adjustable means in its high pressure braking position, and means for automatically moving the said adjustable means from its high pressure braking position to its low pressure braking position upon a depletion of pressure in the triple valve.

7. A triple valve for an air brake apparatus comprising a service valve subject to brake pipe, brake cylinder and emergency reservoir pressures and operating upon a reduction of brake pipe pressure to admit air to the brake cylinder in direct ratio to the brake pipe reduction, means whereby the brake cylinder pressure will move the service valve to lap position when the desired degree of pressure is in the brake cylinder, manually operable means to vary the ratio of brake cylinder pressure developed from a given brake pipe reduction, said means having a low pressure braking position and a high pressure braking position, means whereby brake pipe pressure will hold said manually operable means in its high pressure braking position, and means for automatically moving the said means from its high pressure braking position to its low pressure braking position upon a depletion of pressure in the triple valve.

8. A triple valve in accordance with claim 5, provided with a high pressure brake cylinder equalizing diaphragm and with a low pressure brake cylinder equalizing diaphragm, and manually adjustable means for rendering either of said diaphragms ineffective whereby a high or a low brake cylinder pressure may be developed from a given brake pipe reduction, the brake cylinder pressure operating on the effective equalizing diaphragm moving the service valve to lap position.

9. A triple valve in accordance with claim 8, wherein the two equalizing diaphragms are of different effective areas.

10. A triple valve for air brake apparatus comprising a service valve subject to brake pipe, brake cylinder and emergency reservoir pressures and operating upon a reduction of brake pipe pressure to place the brake pipe and the brake pipe reservoir in communication with the brake cylinder for a service application of the brakes the brake cylinder pressure assisting the brake pipe pressure in moving the service valve to lap position, and adjustable means to vary the degree of brake cylinder pressure required to move the service valve to lap position.

11. A triple valve for air brake apparatus comprising a service valve subject to brake pipe, brake cylinder and emergency reservoir pressures and operating upon a reduction of brake pipe pressure to place the brake pipe and the brake pipe reservoir in communication with the brake cylinder for a service application of the brakes the brake cylinder pressure assisting the brake pipe pressure in moving the service valve to lap position adjustable means to vary the degree of brake cylinder pressure required to move the service valve to lap position, and means whereby brake pipe pressure will hold said adjustable means in its high pressure braking position.

12. A triple valve for air brake apparatus comprising a service valve subject to brake pipe, brake cylinder and emergency reservoir pressures and operating upon a reduction of brake pipe pressure to place the brake pipe and the brake pipe reservoir in communication with the brake cylinder for a service application of the brakes the brake cylinder pressure assisting the brake pipe pressure in moving the service valve to lap position, adjustable means to vary the degree of brake cylinder pressure required to move the service valve to lap position, means whereby brake pipe pressure will hold said adjustable means in its high pressure braking position, and means for automatically moving said adjustable means from its high pressure braking position to its low pressure braking position upon a depletion of pressure in the triple valve.

13. In an air brake apparatus, the combination of a brake pipe, a brake pipe reservoir formed of two sections, an emergency reservoir, a triple valve comprising a service application valve subject to brake pipe, brake cylinder and emergency reservoir pressures and operating upon a reduction of brake pipe pressure to place the brake pipe and the brake pipe reservoir in communication with the brake cylinder for a service application of the brakes the brake cylinder presssure assisting the brake pipe pressure in moving the service valve to lap position, and adjustable means to vary the degree of brake cylinder pressure required to move the service valve to lap position, said adjustable means in one position cutting out one section of the brake pipe reservoir for low pressure braking and in another position cutting in both sections of the said brake pipe reservoir for high pressure braking.

14. In an air brake apparatus, the combination of a brake pipe, a brake pipe reservoir formed of two sections, an emergency reservoir formed of two sections, a triple valve comprising a service application valve subject to brake pipe, brake cylinder and emergency reservoir pressures and operating upon a reduction of brake pipe pressure to place the brake pipe and the brake pipe reservoir in communication with the brake cylinder for a service application of the brakes the brake cylinder pressure assisting the brake pipe pressure in moving the service valve to lap position, and adjustable means to vary the degree of brake cylinder pressure required to move the service valve to lap position, said adjustable means in one position cutting out one section of the brake pipe reservoir and one section of the emergency reservoir for low pressure braking and in another position cutting in both sections of said reservoirs for high pressure braking.

15. In an air brake apparatus, the combination of a brake pipe, a brake pipe reservoir, an emergency reservoir, a triple valve comprising a service application valve subject to brake pipe, brake cylinder and emergency reservoir pressures and operating upon a reduction of brake pipe pressure to place the brake pipe and the brake pipe reservoir in communication with the brake cylinder for a service application of the brakes, the brake cylinder pressure assisting the brake pipe pressure in moving the service valve to lap position, adjustable means to vary the degree of brake cylinder pressure required to move the service valve to lap position, said adjustable means having one position for low pressure braking and another position for high pressure braking, and means whereby brake pipe pressure will hold said adjustable means in its high pressure braking position.

16. In an air brake apparatus, the combination of a brake pipe, a brake pipe reservoir, an emergency reservoir, a triple valve comprising a service application valve subject to brake pipe, brake cylinder and emergency reservoir pressures and operating upon a reduction of brake pipe pressure to place the brake pipe and the brake pipe reservoir in communication with the brake cylinder for a service application of the brakes the brake cylinder pressure assisting the brake pipe pressure in moving the service valve to lap position, adjustable means to vary the degree of brake cylinder pressure required to move the service valve to lap position, said adjustable means having one position for low pressure braking and another position for high pressure braking, means whereby brake pipe pressure will hold said adjustable means in its high pressure braking position, and means for automatically moving the said adjustable means from its high pressure braking position to its low pressure braking position upon a depletion of pressure in the triple valve.

17. In an air brake apparatus the combination of a brake pipe, a brake pipe reservoir formed of two sections, an emergency reservoir, a triple valve comprising a service application valve subject to brake pipe, brake cylinder and emergency reservoir pressures and operating upon a reduction of brake pipe pressure to place the brake pipe and the brake pipe reservoir in communication with the brake cylinder for a service application of the brakes the brake cylinder pressure assisting the brake pipe pressure in moving the service valve to lap position, and a change-over valve to vary the degree of brake cylinder pressure required to move the service valve to lap position, said change-over valve having a high pressure braking position and a low pressure braking position.

18. In an air brake apparatus the combination of a brake pipe, a brake pipe reservoir formed of two sections, an emergency reservoir, a triple valve comprising a service application valve subject to brake pipe, brake cylinder and emergency reservoir pressures and operating upon a reduction of brake pipe pressure to place the brake pipe and the brake pipe reservoir in communication with the brake cylinder for a service application of the brakes the brake cylinder pressure assisting the brake pipe pressure in moving the service valve to lap position, and a change-over valve to vary the degree of brake cylinder pressure required to move the service valve to lap position, said change-over valve having a high pressure braking position and a low pressure braking position and in its high pressure braking position cutting in both sections of the said brake pipe reservoir, and in its low pressure braking position cutting out one section of said brake pipe reservoir.

19. In an air brake apparatus the combination of a brake pipe, a brake pipe reservoir formed of two sections, an emergency reservoir formed of two sections, a triple valve comprising a service application valve subject to brake pipe, brake cylinder and emergency reservoir pressures and operating upon a reduction of brake pipe pressure to place the brake pipe and the brake pipe reservoir in communication with the brake cylinder for a service application of the brakes the brake cylinder pressure assisting the brake pipe pressure in moving the service valve to lap position, and a change-over valve to vary the degree of brake cylinder pressure required to move the service valve to lap position, said change-over valve having a high pressure braking position and a low pressure braking position and in its high pressure braking position cutting in both sections of the said two reservoirs, and in its low pressure braking position cutting out one section of each of said two reservoirs.

20. A triple valve operating upon a reduction of brake pipe pressure to admit air to the brake cylinder for an application of the brakes and operating upon an increase in brake pipe pressure to connect the brake cylinder to atmosphere, and provided with a service application valve operating means consisting of an actuating diaphragm, a high pressure equalizing diaphragm, a low pressure equalizing diaphragm, an emergency diaphragm, an actuating chamber in direct communication with the brake pipe, a high pressure equalizing chamber between the actuating diaphragm and the high pressure equalizing diaphragm, a low pressure equalizing chamber between the said high pressure and the said low pressure diaphragms, an emergency reservoir chamber in communication with the emergency reservoir, an application valve operatively connected to said diaphragms and in its application position admitting air to the equalizing chambers and the brake cylinder and in its release position connecting the brake cylinder to atmosphere, and manually operable means to control the flow of brake cylinder air to the equalizing chambers.

21. A triple valve operating upon a reduction of brake pipe pressure to admit air to the brake cylinder for an application of the brakes and operating upon an increase in brake pipe pressure to connect the brake cylinder to atmosphere, and provided with a service application valve operating means consisting of an actuating diahpragm, a high pressure equalizing diaphragm, a low pressure equalizing diaphragm, an emergency diaphragm, an actuating chamber in direct communication with the brake pipe, a high pressure equalizing chamber between the actuating diaphragm and the high pressure equalizing diaphragm, a low pressure equalizing chamber between the said high pressure and the said low pressure diaphragms, an emergency reservoir chamber in communication with the emergency reservoir, an application valve operatively connected to said diaphragms and in its application position admitting air to the equalizing chambers and to the brake cylinder, and manually operable means to control the flow of air to the equalizing chambers to render either one of the equalizing diaphragms ineffective to move the service valve to lap position.

22. A triple valve operating upon a reduction of brake pipe pressure to admit air to the brake cylinder for an application of the brakes and operating upon an increase in brake pipe pressure to connect the brake cylinder to atmosphere, and provided with a service application valve operating means consisting of an actuating diaphragm, a high pressure equalizing diaphragm, a low pressure equalizing diaphragm, an emergency diaphragm, an actuating chamber in direct communication with the brake pipe, a high pressure equalizing chamber between the actuating diaphragm and the high pressure equalizing diaphragm and in communication with the brake cylinder, a low pressure equalizing chamber between the said high pressure and the said low pressure diaphragms, a retention chamber between the low pressure equalizing diaphragm and the emergency diaphragm, an emergency reservoir chamber in communication with the emergency reservoir, an application valve operatively connected to said diaphragms and in its application position admitting air to the equalizing chambers and the brake cylinder, in its release position connecting the equalizing chambers to the retention chamber and in its lap position closing said communication, and manually operable means to control the flow of air to the equalizing chambers to render either one of the equalizing diaphragms ineffective to move the service valve to lap position.

23. A triple valve operating upon a reduction of brake pipe pressure to admit air to the brake cylinder for an application of the brakes and operating upon an increase in brake pipe pressure to connect the brake cylinder to atmosphere, and provided with a service application valve operating means consisting of an actuating diaphragm, a high pressure equalizing diaphragm, a low pressure equalizing diaphragm, an emergency diaphragm, an actuating chamber in direct communication with the brake pipe, a high pressure equalizing chamber between the actuating diaphragm and the high pressure equalizing diaphragm and in communication with the brake cylinder, a low pressure equalizing chamber between the said high pressure and the said low pressure diaphragms, a retention chamber between the low pressure equalizing diaphragm and the emergency diaphragm, an emergency reservoir chamber in communication with the emergency reservoir, an application valve operatively connected to said diaphragms and in its application position admitting air to the equalizing chambers and the brake cylinder, in its release position connecting the equalizing chambers to the retention chamber and in its lap position closing said communication, and a change-over valve to control the flow of air to the equalizing chambers and having a high pressure braking position and a low pressure braking position, said valve in its low pressure braking position connecting both of the said equalizing chambers to the brake cylinder, and in its high pressure braking position connecting only the high pressure equalizing chamber to the brake cylinder.

24. A triple valve for an air brake apparatus comprising a service valve subject to brake pipe, brake cylinder and emergency reservoir pressures and operating upon a reduction of brake pipe pressure to admit air to the brake cylinder in direct ratio to the brake pipe reduction, means whereby the brake cylinder pressure will move the service valve to lap position when the desired degree of pressure is in the brake cylinder, manually operable change-over valve means to vary the ratio of brake cylinder pressure developed from a given brake pipe reduction, and means whereby brake pipe pressure will hold said adjustable means in its high pressure braking position.

25. A triple valve for an air brake apparatus comprising a service valve subject to brake pipe, brake cylinder and emergency reservoir pressures and operating upon a reduction of brake pipe pressure to admit air to the brake cylinder in direct ratio to the brake pipe reduction, means whereby the brake cylinder pressure will move the service valve to lap position when the desired degree of pressure is in the brake cylinder, manually operable change-over valve means to vary the ratio of brake cylinder pressure developed from a given brake pipe reduction, means whereby brake pipe pressure will hold said adjustable change-over valve means in its high pressure braking position, and means for automatically moving the said adjustable change-over valve from its high pressure braking position to its low pressure braking position upon a depletion of pressure in the triple valve.

26. A triple valve for an air brake apparatus comprising means operating upon a reduction of brake pipe pressure to build up brake cylinder pressure in direct ratio to the brake pipe reduction the brake cylinder pressure moving the valve to lap position, manually adjustable change-over valve means to vary the ratio of brake cylinder pressure produced by a given brake pipe reduction, and means whereby brake pipe pressure will hold said adjustable change-over valve in its high pressure braking position.

27. A triple valve for an air brake apparatus comprising means operating upon a reduction of brake pipe pressure to build up brake cylinder pressure in direct ratio to the brake pipe reduction the brake cylinder pressure moving the valve to lap position, manually adjustable change-over valve means to vary the ratio of brake cylinder pressure produced by a given brake pipe reduction, said valve means having a high pressure braking position and a low pressure braking position, means whereby brake pipe pressure will hold said adjustable change-over valve means in its high pressure braking positon, and means for automatically moving the said adjustable change-over valve means from its high pressure braking position to its low pressure braking position upon a depletion of pressure in the triple valve.

In testimony whereof we hereunto affix our signatures.

SPENCER G. NEAL.
WILLIAM ASTLE.
EDWARD P. WILSON.